(No Model.)  2 Sheets—Sheet 1.
F. O. KUNZ.
APPARATUS FOR PREPARING GRAIN FOR FERMENTATION.
No. 260,300.  Patented June 27, 1882.
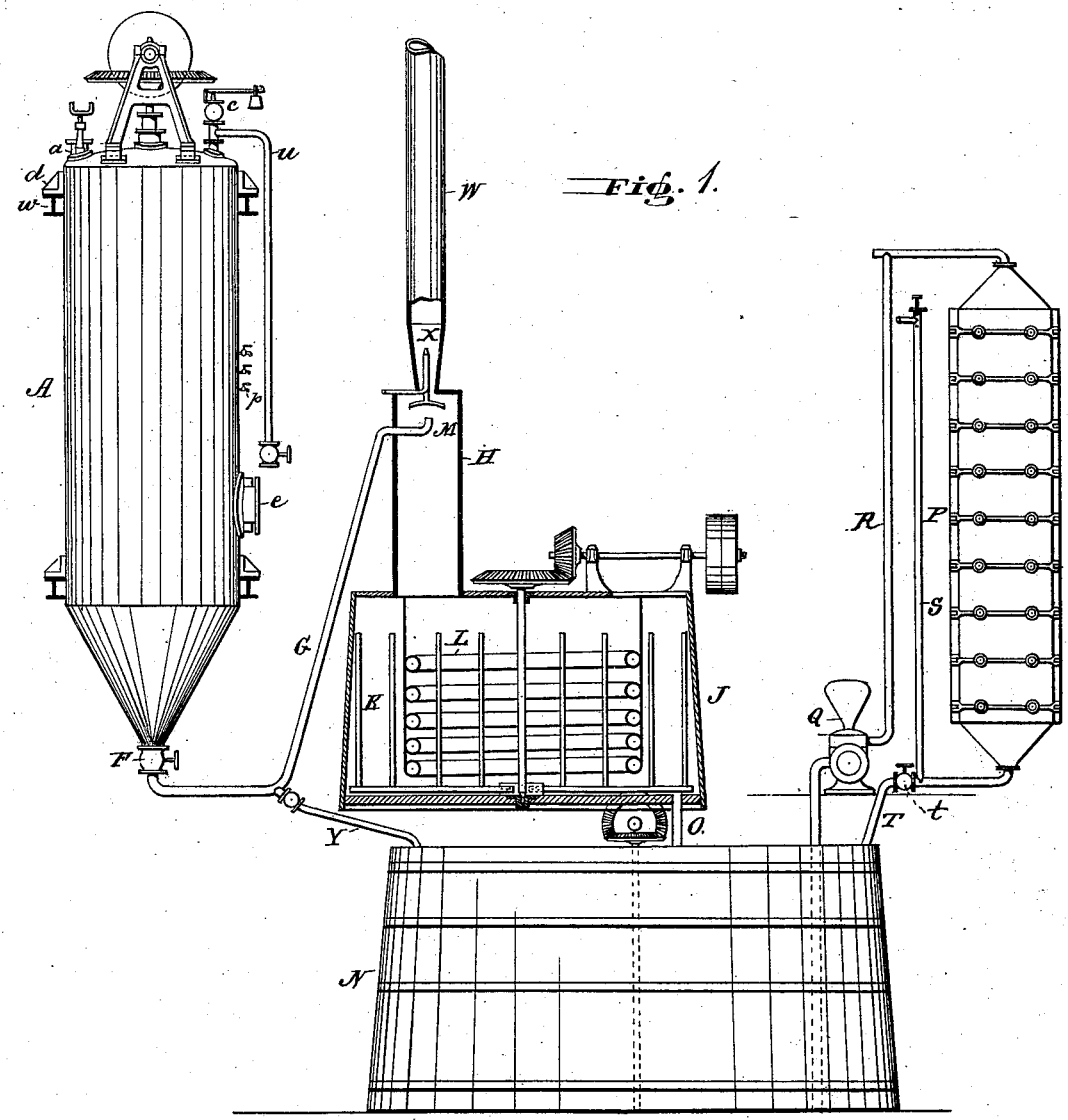
Witnesses:
A. W. Long.
A. M. Tanner.
Inventor.
Frederick O. Kunz
By Paine, Grafton & Ladd
Attorneys.

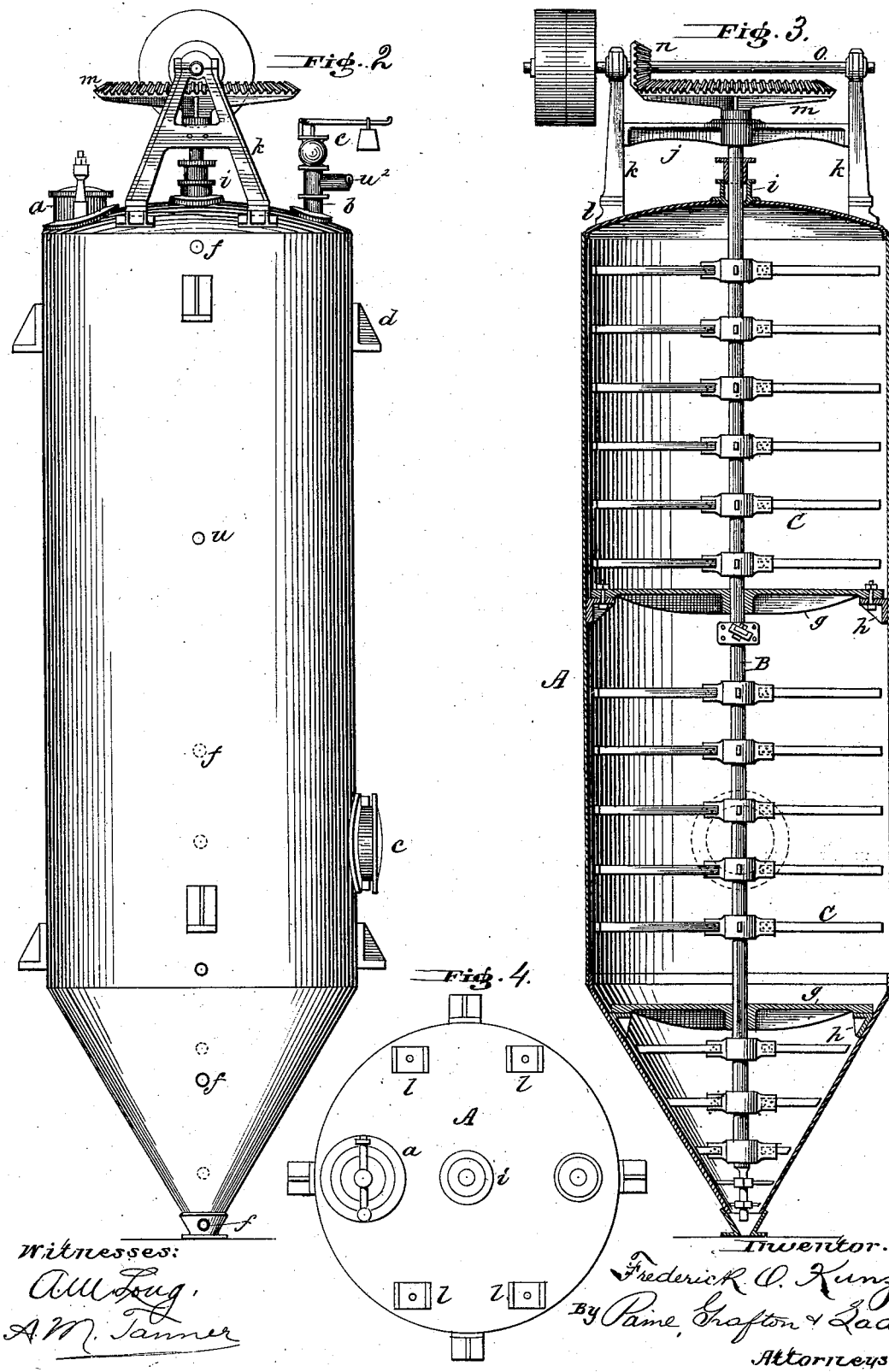

UNITED STATES PATENT OFFICE.

FREDERICK O. KUNZ, OF OMAHA, NEBRASKA, ASSIGNOR TO ILER & CO., OF SAME PLACE.

APPARATUS FOR PREPARING GRAIN FOR FERMENTATION.

SPECIFICATION forming part of Letters Patent No. 260,300, dated June 27, 1882.

Application filed November 14, 1881. (No model.)

*To all whom it may concern:*

Be it known that I, FREDERICK OTTO KUNZ, a native of Germany, who has declared his intention of becoming a citizen of the United States, residing at Omaha, in the county of Douglas and State of Nebraska, have invented certain new and useful Improvements in Apparatus for Mashing Grain; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an apparatus for cooking and mashing grain, or preparing grain for fermentation for distilling and other purposes.

The apparatus constituting my invention comprises a cooker in which mill-ground grain is disintegrated or reduced to a pulpy mass by means of steam and a stirring mechanism, and from whence the mash is conducted to the top of a cylinder or chamber arranged above a mash-tub having the customary stirrer and cooling-worm. The mash is discharged at the top of the aforesaid chamber or cylinder, and the latter is surmounted by a chimney or flue, so as to produce a strong upward current of air in the cylinder or chamber, which will tend to cool the mash to a considerable extent as it falls through the cylinder or chamber into the mash-tub in the form of a spray or shower. The mash passes from the mash-tub into a receiver or tank, from which it is pumped into a cooling-column having a current of water passing through it in an upward direction, while the mash flows through in a downward direction.

The arrangement of devices above recited comprises a "plant" or apparatus for reducing the grain, mashing the same, and preparing the grain for fermentation.

In the accompanying drawings, Figure 1 represents the arrangement of devices comprising my entire apparatus. Fig. 2 is a side elevation of the cooker. Fig. 3 is a vertical section of the same; and Fig. 4 is a top view, showing the stirring mechanism detached.

The cooker A consists of a vertical cylinder of any desired capacity, made of heavy boiler-iron to withstand the necessary pressure. An opening, $a$, in the head of the cooker, adapted to be closed by a suitable cap or cover, serves for the introduction of the mill-ground material or grain. A short pipe, $b$, rising from the top head of the cooker, receives a T-coupling, to which a steam blow-off pipe, $u$, is attached, and also the safety-valve $c$. The cooker is supported upon suitable beams or girders, $w$, by means of flanges $d$, projecting from said cooker. A man-hole, $e$, suitably located in the latter, serves for cleaning and other purposes. Steam is admitted into the cooker from a suitable boiler through the medium of a series of pipes, $f$, which enter the cooker on different planes, so as to insure the perfect distribution of steam throughout the mass contained in the cooker.

A shaft, B, passing in a vertical direction through the cooker, is provided with a series of arms, C, arranged in different horizontal planes, as is shown in Fig. 3, for mixing the contents of the cooker. The arms may be arranged around the shaft, so as to form a spiral conveyer or screw for more thoroughly mixing the material and feeding it to the bottom discharge-opening of the cooker. The shaft B has its bearings in transverse bars $g$, which are secured to brackets $h$, secured to the inner wall of the cooker, as is shown in Fig. 3. The shaft also passes through a stuffing-box, $i$, in the head of the cooker, and above the same it has its bearing in a transverse bar, $j$, which serves to connect two vertical standards, $k$, and constitutes a supporting-frame with the latter. This frame is secured to brackets $l$, rising from the head of the cooker, as is shown more fully in Fig. 4. Rotary motion is imparted to the shaft B through the medium of a large bevel-gear wheel, $m$, on the upper end of the shaft, and a smaller gear-wheel, $n$, on a horizontal driving-shaft, $o$, having its bearings in the standards $k$. This shaft has suitable pulleys for communicating motion thereto. The grain is introduced into the cooker through the opening $a$, and the water necessary for bringing the mass to the proper consistency may also be supplied through said opening, or else one of the pipes, $u$, leading through the shell of the cooker, may serve as a water-inlet pipe. The amount of water required is up to the gage cock or cocks $p$ on the side of the cooker. Steam is then admitted after the meal has been introduced and the stirrer set in motion, the air being expelled from the cooker through the blow-off pipe. The latter is then closed, and the process of steaming begins, and for corn is carried on up to 297° Fahrenheit, (sixty-five pounds pressure to the square inch.) For rye, wheat, or barley it is only carried up 250° Fahrenheit, (thirty pounds pressure.) After the grain has been cooked a sufficient time, which can be ascertained by its having a uniform light-brown color, as well as by the fluidity of the starch, observed by samples taken occasionally from the cock $p$, steam is shut off, the blow-out pipe is opened, and the steam conducted from the cooker into a suitable condenser, when only one cooker is used. When, however, two or more cookers are employed the steam is conducted from the first to the second, and from the second to the third, and so on indefinitely. When two or more cookers are used mashes of corn and of small grain may be cooked and blown into the mash-tub one after the other, the small grain last. The grain having been properly reduced by the cooking operation, the valve F in the bottom of the cooker is opened, whereupon the steam-pressure existing therein will tend to force the mass through the pipe G, which extends in an upward direction from the cooker and leads into the top of a chamber or cylinder, H, termed by me the "ventilator." The latter is about twenty feet in height, and is surmounted by a chimney or flue, W, of suitable length and diameter to induce a strong upward current of air or draft in the ventilator.

J is a mash-tub of suitable size and construction, which is provided with the customary accessories—such as stirrer K and cooling-worm L—and the ventilator rests upon the same in such a manner that the air is drawn into the ventilator from the mash-tub, the latter being left partly open for this purpose. The mass from the cooker is ejected from the outlet-pipe G at the upper end of the ventilator, and flows through the latter in the form of a spray or shower. In view of the draft or current of air present in the ventilator, it follows that the mash is considerably cooled in its descent through the same prior to its delivery into the mash-tub.

The draft in the ventilator may be increased by means of a jet of steam, which is conducted into the chimney near its junction with the ventilator. As shown in the present instance, a steam-injector, X, is employed, and the latter is provided with or carries a concave shield or plate, M, against which the mash is thrown. The chief object of this shield is to prevent portions of the mash from being drawn up into the chimney when the latter is not made sufficiently high. The cooling of the mash continues in the mash-tub until the proper temperature is reached, when the malt is added, with the necessary quantity of water to reduce it to the required thickness, after which stirring is continued for about thirty minutes, when the mass is let down into the receiver N through a discharge-pipe, O, in the bottom of the mash-tub. From this receiver the mash is run or pumped into the top of a cooling-column, P, which is traversed by a series of transverse pipes connected with a water-supply pipe at the bottom and with a water-discharge tube at the top, so as to cause the water to flow in an upward direction. Q is the pump for forcing the mash into the cooler through the pipe R, and S is a stand-pipe, from the top of which the mash is taken at a proper temperature for the fermenters. A pipe, T, leading from a point beyond the stand-pipe S into the receiver, serves for conducting the contents of the cooler into the receiver when cleaning the cooler and stand-pipe. Said pipe T is provided with a suitable stop-cock, $t$. Y is a pipe for conducting the contents of the cooker directly into the receiver.

The special construction of the cooling-column employed by me will form the subject-matter of a separate patent, and I only claim in the present instance its combination with the other parts of my apparatus.

Having thus described my invention, what I claim as new, and desire to secure by Letters Patent, is—

1. In an apparatus for preparing grain for fermentation, the combination of a steam reducer or digester, a cooling-column, as described, a pipe or tube connecting the bottom of the reducer with the top of said cooling-column, a mash-tub below the cooling-column, and means, substantially as described, for creating an upward current of air in the cooling-column, substantially as herein set forth.

2. The combination of the reducer or digester with a cooling-column, as described, provided with a draft-stack, a mash-tub located below the cooling-column, and a pipe connecting the bottom of the reducer and the top of the cooling-column, as and for the purpose set forth.

In testimony whereof I affix my signature in presence of two witnesses.

FREDERICK OTTO KUNZ.

Witnesses:
CHAS. E. BRUMESLED,
GEO. A. VAN INWEGEN.